Patented Oct. 6, 1931

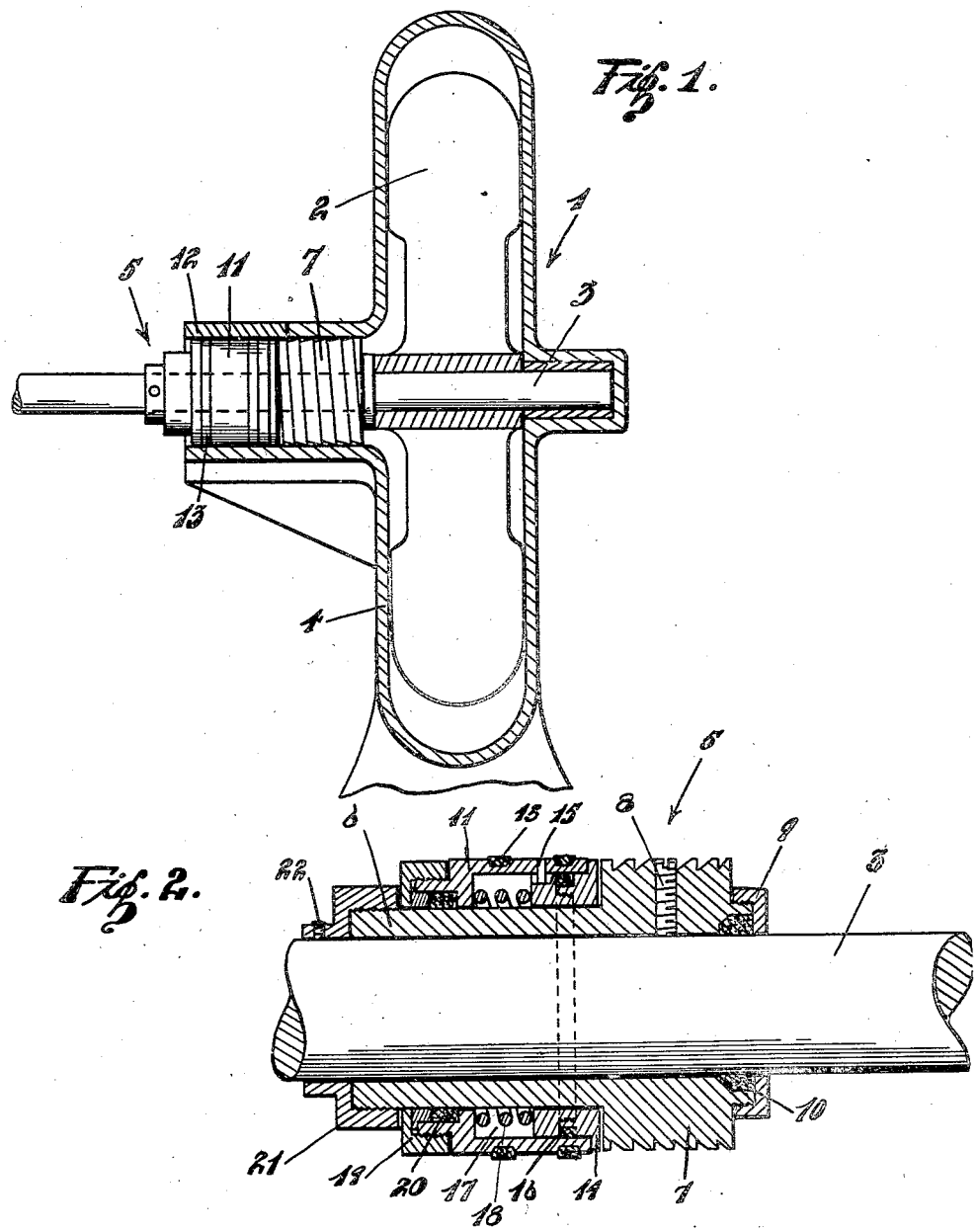

1,826,057

UNITED STATES PATENT OFFICE

JAMES G. DOBBINS, OF LONG BEACH, CALIFORNIA

PACKING RING FOR PUMPS

Application filed May 19, 1928. Serial No. 278,977.

This invention relates to a packing member for pumps, and the like, and is particularly applicable to centrifugal types of pumps.

An object of my invention is to provide a packing member which will not wear the shaft of the pump.

Another object is to provide a device of the character stated which does not require a cooling system to keep the bearing from heating.

Advantages of my packing member are that it need not be replaced at frequent intervals since there is little appreciable wear thereon and no adjustments are required while the pump is in operation.

Another object of my invention is to provide a more affective seal about the shaft of the pump and further, to prevent oil from getting into the bearings.

A feature of my invention is that there is no fire hazard while pumping inflammable materials since the bearing runs perfectly cool.

Other objects, advantages, and features of invention may appear from the accompanying drawings, the subjoined detailed description, and the appended claims.

In the drawings:

Fig. 1 is a longitudinal sectional view of a pump with my packing ring in position thereon.

Fig. 2 is a longitudinal sectional view of the packing ring.

Referring more particularly to the drawings; the numeral 1 indicates the usual and well known type of centrifugal pump, which includes an impeller 2 mounted upon a shaft 3. The shaft 3 extends out of one side of the pump housing 4 in order that the impeller may be driven by a suitable source of power.

My packing ring 5 comprises a sleeve 6 on one end of which an enlarged head 7 is formed. The head is provided with a spiral groove 7' on the outer surface thereof for the purpose of returning any fluid back into the pump chamber which might tend to pass along the head. The sleeve is secured to the shaft 3 by suitable means, such as the set screw 8, or the like. A ring 9 screws onto the inner end of the sleeve 6 and holds packing 10 in position, the packing surrounding the shaft 3 and prevents leakage along the shaft.

A tubular packing member 11 surrounds the sleeve 6 and is non-rotatably held in the pump housing 4 by the usual bearing cap 12 which clamps the member 11 when said cap is bolted down. Packing rings 13 are provided on the outer surface of the member 11 to prevent leakage around the outside thereof. A disc 14 fits into one end of the member 11 and bears against the outer face of the head 7. This disc is non-rotatably held relative to the member 11 by means of a dowel pin 15 which extends through the member 11 and into a slot in the disc. A packing ring 16 is provided in the disc 14, which ring bears against the inner surface of the member 11 to prevent leakage past the disc. An oil chamber 17 is provided between the member 11, the sleeve 6, and the disc 14.

A spring 18 is positioned in the oil chamber 17 and bears against the disc 14 to urge said disc against the outer face of the head 7. A packing nut 19 screws onto the outer end of the member 11 and holds the packing 20 in position so that there is no leakage from the oil chamber 17 along the outer surface of the sleeve 6. A lock nut 21 screws onto the outer end of the sleeve 6 and is secured to the shaft 3 by a set screw 22, or the like. Thus it will be seen that the member 11, and related parts, are held against end-wise movement on the sleeve 6 by the head 7 on one end and the lock nut 21 on the other.

The shaft 3 in its rotation does not wear against any part of the packing since the sleeve and attached parts rotate therewith and there would only be slight wear within the packing itself, the parts of which are all readily accessible and could be quickly replaced as necessary.

Having described my invention, I claim:

1. A packing for pumps and the like, including a pump housing, and an impeller shaft extending therefrom, a packing ring including a sleeve, a head formed on the inner end of said sleeve, means securing said sleeve to the shaft, a tubular packing member surrounding said sleeve, said tubular packing member being secured in the housing and non-rotatably held therein, a disc in one end of said member adapted to bear against said head, a pin extending through said tubular member into said disc, and a lock nut screwed onto the outer end of said sleeve to prevent end-wise movement between the tubular packing member and said sleeve.

2. A packing for pumps and the like, including a pump housing, and an impeller shaft extending therefrom, a packing ring including a sleeve, a head formed on the inner end of said sleeve, means securing said sleeve to the shaft, a tubular packing member surrounding said sleeve, said tubular packing member being secured in the housing and non-rotatably held therein, a disc in one end of said member adapted to bear against said head, a pin extending through said tubular member into said disc, and a lock nut screwed onto the outer end of said sleeve to prevent end-wise movement between the tubular packing member and said sleeve, said packing member having a chamber formed therein around said sleeve, a spring in said chamber bearing against the disc to urge the same against the head, and packing in the disc adapted to bear against the inner surface of the tubular packing member.

3. A packing for pumps and the like, including a pump housing, and an impeller shaft extending therefrom, a packing ring including a sleeve, a head formed on the inner end of said sleeve, means securing said sleeve to the shaft, a tubular packing member surrounding said sleeve, said tubular packing member being secured in the housing and non-rotatably held therein, a disc in one end of said member adapted to bear against said head, a pin extending through said tubular member into said disc, and a lock nut screwed onto the outer end of said sleeve to prevent end-wise movement between the tubular packing member and said sleeve, a ring screwed onto the inner end of the head, packing in the head around the shaft against which the ring bears, and a packing nut screwed onto the packing member, packing in the packing member around the sleeve against which the packing nut bears.

4. A packing for pumps and the like, including a pump housing, an impeller shaft extending therefrom, a packing ring including a sleeve, a head formed on the inner end of said sleeve, means securing said sleeve to the shaft, a tubular packing member surrounding said sleeve, said tubular packing member being secured in the housing and non-rotatably held therein, a disc in one end of said member adapted to bear against said head a pin extending through said tubular member into said disc, and a lock nut screwed onto the outer end of said sleeve to prevent end-wise movement between the tubular packing member and said sleeve, a ring screwed onto the inner end of the head, packing in the head around the shaft against which the ring bears, and a packing nut screwed onto the packing member, packing in the packing member around the sleeve against which the packing nut bears, said packing member having a chamber formed therein around said sleeve, a spring in said chamber bearing against the disc to urge the same against the head, and packing in the disc adapted to bear against the inner surface of the tubular packing member.

5. A packing for pumps and the like, including a pump housing, an impeller shaft extending therefrom, a packing ring including a sleeve, a head on said sleeve, a set screw extending through the head against the shaft, a ring screwed onto the head, packing in the head around the shaft against which the ring bears, a tubular packing member surrounding the sleeve, a disc in the member adapted to bear against the head, a dowel pin extending through the member into the disc, a packing ring around the disc adapted to bear against the inner surface of the tubular packing member, said packing member having an oil chamber formed therein, a spring in said chamber bearing against the disc to urge the same against the head, a packing ring screwed onto the packing member, packing in the member around the sleeve against which packing the ring is adapted to bear, a lock nut screwed onto the outer end of the sleeve, and a set screw extending through the lock nut against the shaft.

6. A packing for pumps and the like including a pump housing and an impeller shaft extending therefrom, a packing ring including a sleeve, means securing said sleeve to the shaft, a tubular packing member surrounding the sleeve, means non-rotatably securing said packing member in the housing, a head on said sleeve, against which said packing member bears, means holding said packing member against endwise movement along the sleeve, a disc in said packing member, and packing means between said disc and packing member.

In testimony whereof, I affix my signature.

JAMES G. DOBBINS.